United States Patent
Miller

[15] 3,699,411
[45] Oct. 17, 1972

[54] AUTOMATIC CONTROL SYSTEM FOR FORMING FLUTED CUTTING TOOLS

[72] Inventor: Warner G. S. Miller, 3756 Danmont Circle, Newbury Park, Calif. 91320

[22] Filed: July 10, 1970

[21] Appl. No.: 53,824

[52] U.S. Cl.....................................318/39, 318/286
[51] Int. Cl. ..............................................B23q 5/28
[58] Field of Search......318/257, 286, 283, 281, 282, 318/291, 293, 466–470, 39

[56] References Cited

UNITED STATES PATENTS

| | | |
|---|---|---|
| 3,249,838 | 5/1966 | Mierendorf................318/293 |
| 3,129,369 | 4/1964 | Littwin......................318/286 |
| 3,295,038 | 12/1966 | Trottman...................318/282 |
| 2,674,706 | 4/1934 | Knosp........................318/286 |
| 3,458,790 | 7/1969 | Wilkerson..................318/293 |
| 3,549,971 | 12/1970 | Van Patten................318/293 |
| 2,747,152 | 5/1956 | Greene......................318/286 |
| 3,248,629 | 4/1966 | Reynolds...................318/257 |
| 3,366,857 | 1/1968 | Jewell et al................318/257 |
| 3,509,436 | 4/1970 | Hovance....................318/257 |

Primary Examiner—Bernard A. Gilheany
Assistant Examiner—Thomas Langer
Attorney—Jack C. Munro

[57] ABSTRACT

In combination with a machine for manufacturing fluted cutting tools, an automatic electronic control system which includes separate circuits for forward and reverse directions of cutting tool movement wherein a single pulse relay controls selection of either the forward or reverse direction.

3 Claims, 5 Drawing Figures

AUTOMATIC CONTROL SYSTEM FOR FORMING FLUTED CUTTING TOOLS

BACKGROUND OF THE INVENTION

The field of this invention relates to machines for the manufacturing of fluted cutting tools and more specifically to an electrical control system for automatically forming the machining operations of producing the flutes upon a cutting tool.

For the forming of holes within hard materials such as metal and wood it has been common to employ the use of a cutting tool which has a cutting edge on its forwardmost surface and the cutting tool being rotated about its longitudinal axis into the workpiece. Such cutting tools have been commonly referred to as drills. It has long been known that the cut portions of the material during the forming of the hole by the drill can frequently interfere with the continued cutting operation during the forming of the particular hole. For this reason, it was desirable to design some means in combination with the drill to effect removal of the chips. A common form of such means has been the locating of a series of flutes angularly displaced about the longitudinal axis of the drill. Each flute comprises a longitudinal recess within the body of the cutting tool, the recess providing access for the chips to be moved upwardly and away from the surface of the workpiece. It was further discovered that to form the flutes in the shape of a helix further increased the efficiency of chip removal. As a result, the use of straight fluted drills and helical fluted drills are in extremely widespread use.

Because such fluted drills are so common, it was found to be desirable to design a machine which facilitated the manufacture of such drills. A common form of such machine provides for the accurate locating of the drill raw material adjacent a cutting disc, providing a motor assembly to effect rotation of the material and the material is to be mounted upon a bed of the machine which is longitudinally movable toward and away from the disc shaped cutting wheel. The raw material is mounted upon a shaft to which is secured a fluted cam, the cam being fluted either helical or straight. A fixed follower is to be associated with the cam and upon movement of the follower along the fluted cam an identical flute is created by the disc cutting wheel within the drill raw material. A clutch mounted index plate is located between the drill raw material and the cam. The index plate permits angular adjustment of the drill raw material with respect to the cam thereby permitting the forming of a plurality of flutes within a single drill.

The most common method of operating one of the previously described machines has been manually. An operator places the raw stock of the drill within a holding chuck and then physically moves the stock into the cutting disc. Because the follower follows the cam surface, a similar surface is formed within the stock. In other words, if a straight flute is being formed, a perfectly straight flute will be formed in the drill raw stock. If a helical flute is being formed, the drill stock will be rotated in a helical pattern exactally identical to the helical pattern formed within the cam. Normally it is desired to form a plurality of flutes within a single drill bit. For this purpose the clutch mounted index plate comes into operation at the end of the forming of a single flute. If it is desired to locate the flutes within the drill stock ninety degrees apart, the index plate is caused to be placed into operation by the operator rotating the drill stock ninety degrees with respect to the cam and temporarily fixing such position through the use of the index plate. The operator then repeats the previous flute forming procedure. This procedure is repeated until the number of desired flutes within the drill stock are to be formed. The resultant formed drill is then removed from the machine with a new portion of raw stock being located within the machine and the entire procedure repeated.

As is readily apparent from the foregoing, the manual formation of drill bits with one of said machines requires full time and attention of an operator. The operator cannot operate any other machine or do any other tasks which is separate from the forming of the drill bits. It is also to be noted that because the drill bits are moved manually into the cutting disc, and such movement inherently not being perfectly uniform, a certain amount of inaccuracy results in the cutting of the flutes within the drill bit.

Previously, there have been some attempts at automating one of the aforesaid mentioned machines. The automation structure generally relates to an electrical control system to be associated with the machine to take over the functions of moving the raw drill stock into the disc cutting wheel in successive increments resulting in the fluted drill construction. However, such previous control systems have employed the use of vacuum tubes instead of solid state curcuitry. It is well known that vacuum tubes decrease in efficiency over a period of time which is commonly referred to as vacuum tube degrading. Vacuum tube degrading will finally result in complete inoperation of the control system or loss of function of a particular portion of the control system. Further, such previous automatic devices incur unwanted electrical impulses within the circuits as a result of the substantial voltage which must be employed to operate the machine. Such unwanted impulses frequently cause double activation of switching apparatus, resulting in the switches not being located in the desired position. Further, it has been discovered that the automatic control system used previously has extreme difficulty in effecting automatic operation of the indexing procedure. Additional disadvantages of previous automatic control systems has been that such systems are substantially large in physical size and of substantial weight making such systems not readily portable. Further, an additional disadvantage of such automatic systems is, once a system is installed upon a machine, it is not readily interchangeable to another machine.

SUMMARY OF THE INVENTION

The apparatus of this invention is designed to be employed in combination with a flute cutting machine for forming rotatable cutting tools. The machine in which the apparatus of this invention is to be employed in combination therewith has the following general characteristics. A longitudinally movable bed upon which is mounted the raw cylindrical shaped stock which will result in the fluted drill. A fixed follower is to be associated with a camming surface which is directly connected through a clutching assembly to the raw drill stock. The raw stock has been securely mounted within a chuck assembly. Upon longitudinal movement of the bed, the follower is conducted along the camming surface causing similar movement of the raw stock. The raw stock is to be conducted against a rotatable cutting disc resulting in a groove being formed within the raw stock similar to the cam surface. By means of the clutch assembly, the raw stock is rotatable with respect to the camming surface. An index plate is associated with the clutch assembly to fixedly locate at a specific angular relation with respect thereto the raw stock with respect to the camming surface. A radially movable pawl is cooperatable with any one of a plurality of recesses located within the index plate to maintain the established angular position between the raw stock and the camming surface.

Upon the employment of the automatic control system of applicants invention in combination with a machine having similar aforesaid described characteristics, the control system is preset as to direction of rotation of the cutting disc. Also, the type of flute to be cut is preset as left handed or right handed. The speed of movement of the raw stock into the cutting disc is established and also the speed of return of the raw stock from the cutting disc is preset. Also, the number of flutes to be formed within the material is established. Further, the control system is preset as to whether a helical flute is being formed or a straight flute. The machine is then caused to operate upon activation of the control system by supplying electrical power through a pulse relay circuit which activates a dual switch which supplies power to the motor assembly connected with the machine. Upon the first flute being completely cut, a micro switch is activated which reverses the motor assembly resulting in back tracking of the cutting disc to the initial cutting position. Also, at the same time, a counter apparatus is activated which denotes the completion of one of the selected plurality of flutes. Upon the raw stock being moved back to its initial cutting position, the rotational movement of the raw stock with respect to the cam surface is caused resulting in radial movement of a pawl from cooperation with a recess within an index plate. The movement of the pawl causes activation of a micro switch which, upon the pawl cooperating with the next successive recess, causes electrical power to be transmitted through the pulse relay apparatus resulting in a reversal of the motor assembly and a repeat of the previous procedure. Because of the angular movement of the raw stock with respect to the cam surface due to the clutching assembly and associated index plate, another flute is formable within the raw stock in parallel relation to the first formed flute but angularly displaced therefrom.

BRIEF DESCRIPTION OF THE DRAWINGS

FIG. 3 is an enlarged side view of the clutch assembly and its associated index plate of the structure shown in FIG. 1;

DETAILED DESCRIPTION OF THE SHOWN EMBODIMENT

Figure 1:
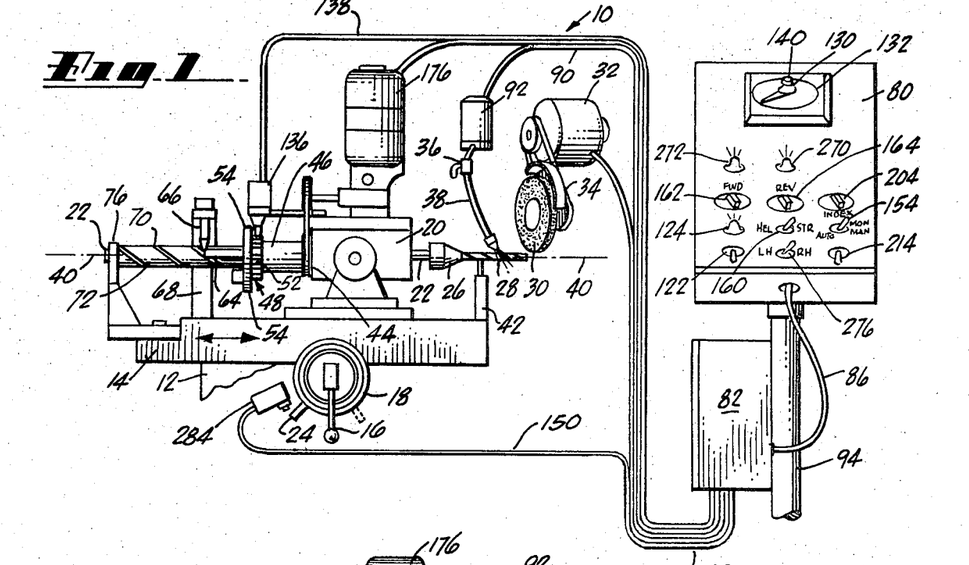
FIG. 1 is an overall side view of the helical flute cutting machine employing the control system of Applicants invention.

Referring particularly to the drawings, there is shown in FIG. 1 a machine 10 for forming flutes in cutting tools which is shown mounted upon a base 12. Mounted upon base 12 is the bed 14 of the machine 10 with the bed 14 being longitudinally movable with respect to base 12. Crank handle 16 permits manual movement of the bed 14 by the operator of the machine. Collar 18 moves in conjunction with handle 16. A gearing mechanism (not shown) operates between the bed 14 and the handle 16. Fixedly supported upon bed 14 is a support 20 which is to rotatably cooperate with shaft 22. Integrally formed upon collar 18 is a flange 24. Shaft 22 is secured to a chuck assembly 26 which is to retain the raw stock 28 from which will be formed the cylindrical fluted drill bit. Raw stock 28 is to be movable into and out of cooperative relationship with fixed cutting disc 30 which is rotatably driven by means of a motor 32 and a driving belt 34. To keep the raw stock 28 cool during the cutting operation, a liquid coolant is to be conducted from a source (not shown) through valve 36 and conduit 38 upon the raw stock 28. The raw stock 28 is accurately positioned upon the cutting axis 40 by means of rest 42.

Figures 2, 4, 5:
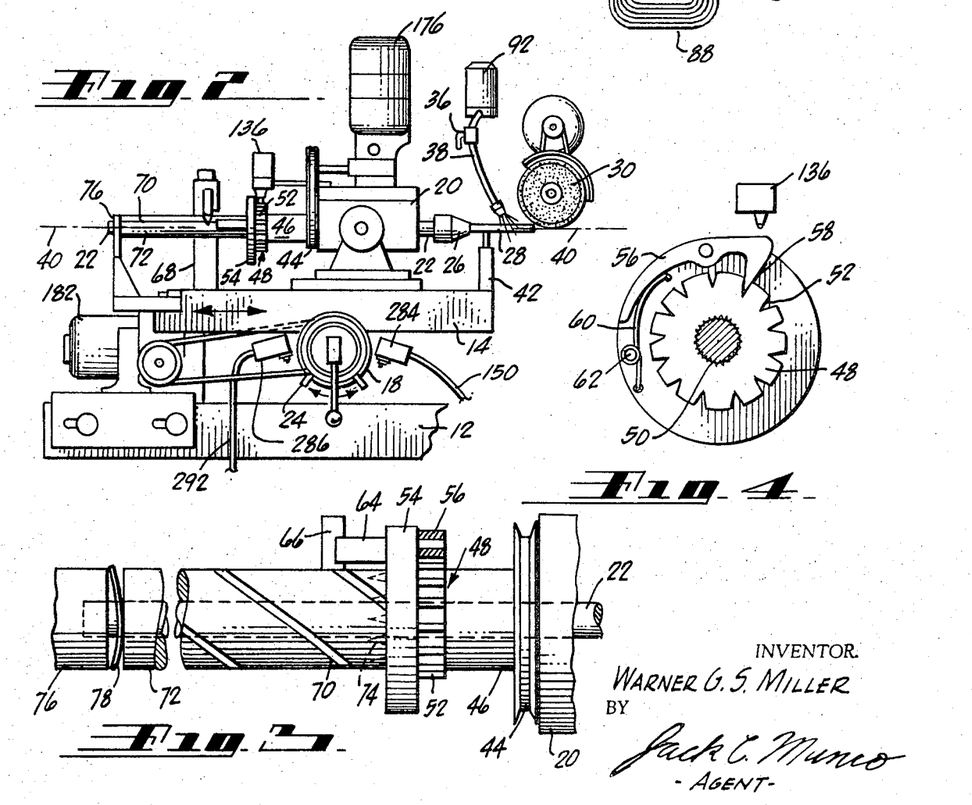
FIG. 2 is a fragmentary view of a portion of the structure of FIG. 1 but showing the machine being adapted for forming straight flutes instead of helical flutes.
FIG. 4 is a partly-in-section view taken along line 4—4 of FIG. 3 showing more clearly the index plate and its associated radially movable pawl.
FIG. 5 is an electrical circuit diagram of the control system of Applicants invention.
Figure 5:
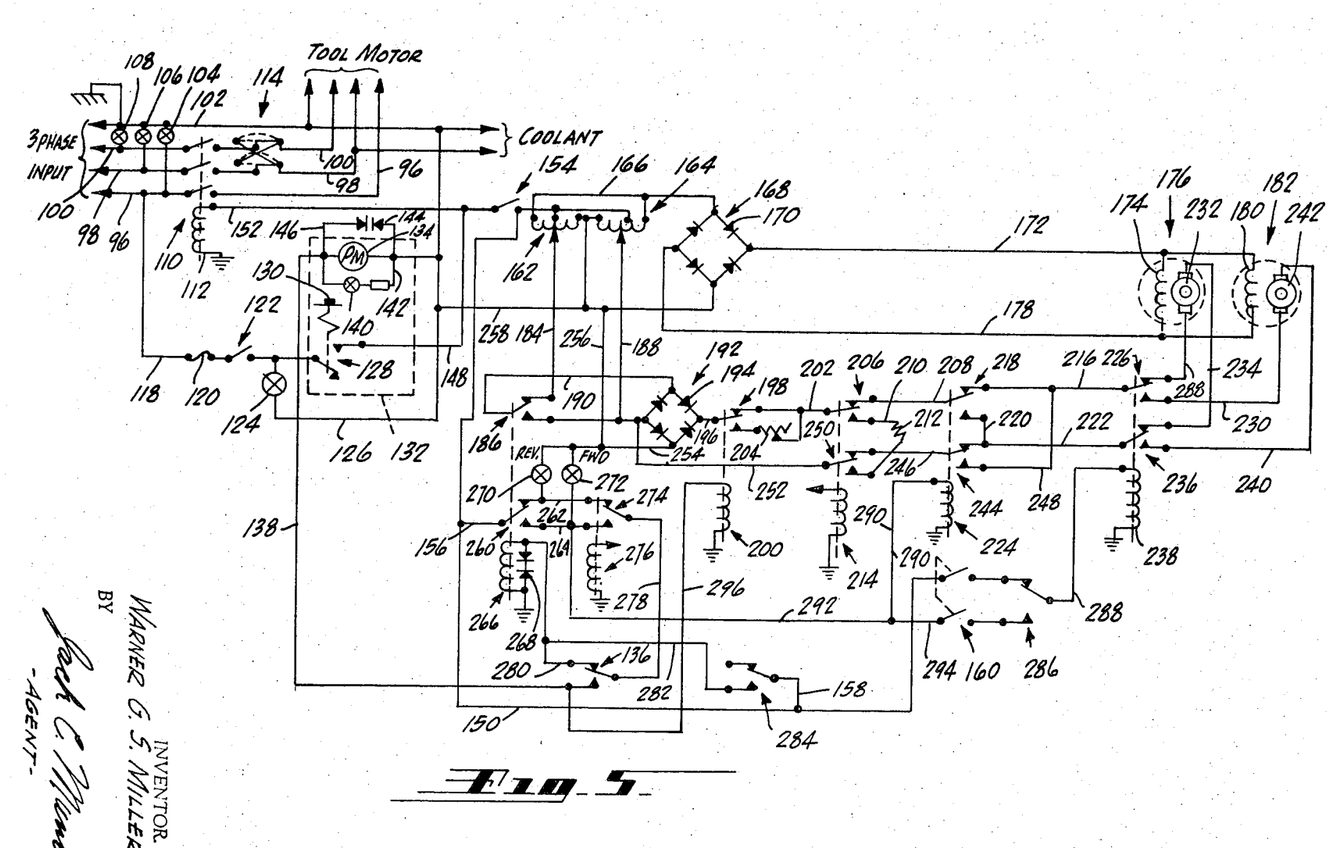

Shaft 22 is fixedly secured to pulley 44 which is located upon enlarged portion 46 of the shaft 22. An index plate 48 is non-rotatably secured upon enlarged portion 46 by means of a spline connection 50. Index plate 48 is to be removable from the shaft 22. Index plate 48 has a series of recesses 52 formed upon its perimeter. Because of spline connection 50, a particular index plate 48 may be removed from the shaft 22 and another index plate can be located upon shaft 22 with a different number of recesses 52 located about its perimeter. Located directly adjacent the index plate 48 is a main supporting plate 54. A pawl 56 is pivotally connected to supporting plate 54 and has a pointed end 58 which is adapted to cooperate with recesses 52 of the index plate 48. A spring 60 is secured to supporting plate 54 by means of pin 62 and functions to cooperate with pawl 56 normally biasing pawl 56 toward engagement with a single recess 52.

On the opposite side of supporting plate 54 is fixedly secured a stop 64. A follower 66 is mounted upon a bracket 68 with the bracket 68 being fixed to the base 12 of the machine 10. Follower 66 is adapted to be contactable with the stop 64 upon the cutting disc 30 being non-associated with the raw stock 28 which is the initial position of the disc 30 prior to performing a cutting operation. Follower 66 cooperates with a cam surface 70 within the cam 72. In FIG. 1 of the drawings, the cam 72 is cylindrical in shape and includes a helical cam surface 70 upon the outermost surface of the cam 72. In FIG. 2 of the drawings, the cam 72 is similarly cylindrical in configuration but includes a straight cam surface 70 thereon which is parallel to the longitudinal axis of the cam 72. It is to be noted that the stop 64 is to be so located to interfere with the cam surface 70. Such interference is necessary so that follower 66 will be insured of contact with stop 64. Supporting plate 54 includes protrusions 74 which are to cooperate with recesses within the cam 72. A stop nut 76 cooperates through a spring 78 at the opposite end of the cam 72 to bias cam 72 toward supporting plate 54. Because of the cooperative relationship between the supporting plate 54 and the cam 72 by means of protrusions 74, relative movement therebetween is prevented due to the biasing action of spring 78. Supporting plate 54 and the cam 72 are rotatably supported upon shaft 22. The stop nut 76 is secured to the terminal end of shaft 22 with the spring 78 being located about shaft 72.

The foregoing described machine structure does not itself form a specific part of Applicants invention. The control system forming Applicants invention has been designed to be primarily applicable to such machine structure. The machine structure as previously described is basically similar to the machines manufactured by several different manufacturers. However, Applicant does not wish to be limited to such a specific type of machine structure. Applicant believes the program control system of this invention is readily applicable to any flute cutting machine. Also Applicant believes that the control system of his invention can be applied to other types of machines, not only flute cutting machines. For Example, it is envisioned that the control system of Applicants invention could be employed upon the gear making machine which is to be employed to produce either spur or helical type of gears. Any machine which is to produce a structure with a series of cut grooves about a cylindrical member could readily employ Applicants automatic control system.

Applicant has designed the control system of his invention to be located within two separate locations, a program box 80 and a junction box 82. The reason for dividing the control system of Applicants invention into two separate boxes is for safety reasons. The main portion of the circuitry to effect control of the machine 10 is designed to operate on normal household current of approximately 115 volts. However, frequently machine motors operate on 220 volts. Ninety percent of most maintenance problems would occur within the program box 80 which operates on the lower voltage. Therefore, any person which is effecting repair of any portion of the system within the program box 80 while the system is turned on (definitely not an advised procedure but one that is common) there will be less chance of injury if an accidental shortening of the electrical circuit occurs resulting in a shock to the person of only 115 volts versus 220 volts.

The input is supplied through conduit 84 to junction box 82, then transmitted through conductors located within conduit 86 to program box 80. The voltage being conducted to program box 80 is in the range of 115 volts where frequently the voltage supplied within conduit 84 is 220 volts (three phase type of circuit). The 220 current which is supplied to junction box 82 is transmitted through conduit 88 to operate motor 32 to effect rotation of cutting disc 30. Also, from conduit 88 a conductor 90 derives power to effect operation of solenoid 92 which causes flow of coolant through valve 36 in conduit 38. Because of the separating of Applicants control circuitry into two boxes 80 and 82, such can be mounted on a single stanchion 94 as shown in the drawings and then located adjacent the machine 10. However, the junction box 82 can be applied directly to base 12 of the machine 10 with just the program box 80 being located upon stanchion 94. By the separating of the boxes 80 and 82 as aforedescribed, a single program box 80 could be employed for several different machines, each machine having mounted thereon a junction box 82. Such an arrangement would increase the versatility of Applicants apparatus by making Applicants control system readily operatable with several different machines 10. However, a single program box 80 can only operate a single machine 10 at any given time.

Within conduit 84 are located power transmitting conductors 96, 98 and 100 and ground conductor 102. Power indicating lights 104, 106 and 108 are connected between their respective conductors 96, 98 and 100 and ground 102. The purpose of lights 104, 106 and 108 is to show to the operator that power is being transmitted through each conductor of the three phase input. Lights 104 and 106 are mounted upon junction box 82 as shown in the drawings. Conductors 96, 98 and 100 operate through a triple action switch 110 which is to be activated by relay 112. Reverse switch 114 is connected between conductors 98 and 100 and functions to permit passage of power continually through conductors 98 or 100 or allow the current be conducted within conduit 100 be transmitted to conductor 98 and vice-versa. The electric power being transmitted through conductors 96, 98 and 100 is conducted to the tool cutting motor 32. By activation of reverse switch 114 the current is reversed either through the armature of the motor or the field of the motor thereby reversing the direction of rotation of the motor itself. It has been found that it is desirable to reverse the direction of rotation of motor 32 so that the rotation of cutting disc 30 is to be reversed to facilitate cleaning thereof. Also, in some instances it may be desired to reverse the cutting direction of disc 30. Conductor 116 is connected to conductor 98 and is to transmit power to coolant solenoid 92. An extension of ground conductor 102 completes the connection to the solenoid 92.

Power is to be also transmitted through conductor 118 which is connected to conductor 96, through fuse 120 and main power switch 122. Fuse 120 is shown located on junction box 82 as is also reverse switch 114. An indicator light 124 is connected by conductor 126 from conductor 118 to ground conductor 102. The function of light 124 is to denote to the operator whether electric power is being transmitted through conductor 118, fuse 120 and power switch 122. Conductor 118 is then connected to one side of counter switch 128. Switch 128 can be either activated manually by button 130 or by means of counter apparatus 132. The exact connection between the counter apparatus and switch 128 is not shown. However, many such type of counters are readily available within the commercial market. Applicant has found that one type of satisfactory counter mechanism is model number 2170 of the Eagle Signal Corporation of Davenport Iowa. The counter structure in and of itself forms no part of this invention and therefore it is not believed necessary to shown the complex electrical connection between the counter mechanism and the counter switch 128. Within the counter 132 the indexing of the counter is accomplished through the pulse motor 134 which is connected between ground conductor 126 and microswitch 136 by conductor 138. Pulse motor 134 is the type of motor which upon activation does not effect immediate indexing of the counter mechanism, but only upon inactivation of the pulse motor will an indexing of the counter mechanism occur. An indicator light 140 is connected by means of conductor 142 to conductor 138 on each side of the pulse motor 134. It is the function of light 140 to indicate activation of the pulse motor.

It has been found during the activation of the switching mechanisms within Applicants control system, undesirable secondary electrical signals can be transmitted through various portions of the circuit as through conductor 138 to pulse motor 134. Such undesirable electrical signals have been referred to as transients and may cause a reactivation of pulse motor 134 after inactivation which will result in an additional undesirable movement of the index counting mechanism. Each increment of the index counting mechanism is to denote one completed flute cut by cutting disc 30 within raw stock 28. Clearly, additional movements of the index counting mechanism would give false readings as to the number of flutes being cut. To avoid such transients, transient voltage suppressor 144 is connected by conductor 146 to conductor 138 on each side of motor 134. As such secondary electrical signals of the transients are not as powerful as the primary signal, it has been found that the suppressor 144 will absorb the power of such signals and will not permit activation of motor 134.

Upon manual activation of start switch 128, by means of start button 130, an electric signal is to be conducted from conductor 118 to conductor 148. Conductor 148 is directly connected to conductor 150 which is to transmit electric power to conductor 152 and to relay 112 and selection switch 154. Conductor 150 also conducts electric power to conductors 156 and 158 and also to flute selection switch 160. Upon selection switch 154 being closed, electric power is transmitted to the first variable transformer 162 and to second variable transformer 164. Transformers 162 and 164 are each connected by conductor 166 to bridge 168. The function of bridge 168 is to change the current from alternating type of current to direct current by means of the diode rectifiers 170. Power from bridge 168 is conducted through conductor 172 through the field 174 of the index motor 176 and back to bridge 168 through conductor 178. Electric power is also transmitted from conductor 172 to field 180 of a motor 182 and back through conductor 178 to bridge 168.

The electrical signal from the first variable transformer 162 is to be transmitted through conductor 184 to switch 186. The power from second variable transformer 164 is conducted through conductor 188 to the other side of switch 186. Switch 186 is connected by conductor 190 to bridge 192 which is formed similar to bridge 168 having diode rectifiers 194 to change the current from alternating type current to direct current. Bridge 192 is connected by conductor 196 to switch 198. Switch 198 is to be activated by relay 200 which is to conduct from conductor 196 to conductor 202 through resistor 204. Conductor 202 is connected through switch 206 to conductor 208, or if switch 206 is open, current is conducted into conductor 210 and resistor 212. Switch 206 is activated by relay 214. Conductor 208 is connected to conductor 216 through switch 218, or with switch 218 in the open position is connected to conductor 220 which is directly connected to conductor 222. Switch 218 is operated by relay 224. Conductor 216 operates through switch 226 to transmit an electrical signal to conductor 228 with the switch 226 in the normally closed position, or to conductor 230 with the switch 226 in the normally open position. Conductor 228 is connected to one side of the armature 232 of the index motor 176. The other side of armature 232 is connected by conductor 234 to switch 236 which in the normally closed position conducts to conductor 222. Relay 238 upon activation causes simultaneous movement of switches 226 and 236 to the open position connecting conductors 216 and 230 and conductors 222 and 240. Conductor 230 is connected to one side of armature 242 of the motor 182 with conductor 240 being connected to the opposite side of armature 242.

Relay 224 not only functions to cause activation of switch 218 but also switch 244. Switch 244 in the normally closed position will connect conductors 222 and 246, or in the normally open position connect conductor 246 to conductor 248. Conductor 248 is directly connected to conductor 216. Relay 214 not only operates switch 206, but also functions to operate switch 250 simultaneously with switch 206. Switch 250 in the normally closed position connects together conductors 252 and conductor 246. With switch 250 in the normally open position, conductors 252 and 210 are connected together. It is to be noted that with switch 250 in the normally open position and switch 206 also in the normally open position, a direct circuit is produced between conductors 202, 210, resistor 212 and conductor 252. Conductor 252 is connected to bridge 192 with the ground side of bridge 192 being connected through conductors 254, 256, 258 to ground conductor 126. Ground conductor 258 is also connected to bridge 168.

Power transmitting conductor 156 is connected through switch 260 to either conductor 262 or 264. Pulse relay 266 causes simultaneous activation of both switches 186 and 260. It is to be noted that diode rectifier 268 is located across relay 266 to avoid undesirable activation thereof due to transients. Ground conductor 254 is associated with indicator light 270 and connected to conductor 262. Also, ground conductor 254 is associated with indicator light 272 and connected to conductor 264. By activation of switch 274 by means of relay 276, conductor 278 has the option of being connected to either conductor 262 or conductor 264. Conductor 278 is connected to conductor 280 with microswitch 136 in the normally closed position. Conductor 280 is directly connected to relay 266. Conductor 282 connects conductor 280 to microswitch 284. With microswitch 284 in the normally open position, conductors 282 and 158 are connected in a power transmitting manner with electrical power being transmitted to switch 160. If switch 160 is in the closed position, electric power is being transmitted through microswitch 286, which in the normally closed position will conduct to conductor 288. The electric signal within conductor 288 is used to activate relay 238 thereby causing movement of switches 226 and 236 to the normally open position. Relay 224 is connected through conductor 290 to both conductors 292 and 294. Conductor 294 is connected to flute selection switch 160. Conductor 292 is directly connected to conductor 264. Relay 200 is connected by conductor 296 to conductor 138.

The operation of the control system of this invention is as follows: There are three basic settings of the control system of Applicants invention. The first setting would be the strictly manual situation where power is not being conducted through the control system but power is being conducted to the motor 32 to cause operation of the cutting disc 30 and the machine 10 is merely moved manually. This manual setting would be identical to operation on the machine 10 without the program control system of Applicants invention being employed. If a helical cam 72 is being employed the second setting would be to set the control system of Applicants invention for cutting helical flutes within raw stock 28. If a straight flute cam 72 is employed then it will be necessary to not only, as in the helical setting to place motor 176 into operation, but also place motor 182 into operation.

MANUAL SETTING

It will be assumed that electrical power is being transmitted through input lines 96, 98 and 100. Switch 154 is moved to the manual setting opening the circuit not permitting conduction of electric power from conductor 152 to first and second variable transformers 162 and 164 and conductor 150. Upon activation of power switch 122 to the closed position, electric current is transmitted through conductor 118 through fuse 120 to switch 128. Also, indicator light 124 will be activated by the transmitting of a small amount of electric power through conductor 126 to ground line 102. Upon manual activation of start button 130, switch 128 is moved to conduct electric power between conductors 118 and 148. An electric signal is then conducted from conductor 148 through conductor 152 to relay 112. Relay 112 causes activation of triple action switch 110 thereby conducting electric power directly to the cutting disc motor 32. The direction of rotation of the cutting disc 30 can can be established to be in either clock-wise or counter clock-wise by activation of reverse switch 114. Therefore, as the motor 32 is the only portion of the control system activated, complete manual control of the machine 10 is permitted the same as if the control system of Applicants invention was not associated with the machine 10. The inclusion of this manual setting is if for any reason the operator desires to accomplish the cutting of the raw stock 28 manually instead of automatic cutting thereof, such can be accomplished.

AUTOMATIC SETTING — HELICAL FLUTE

The counter mechanism of the counter 132 is to be preset to the number of desired flutes to be formed within raw stock 28. The number of flutes should be identical to the number of recesses 52 within the index plate 48 that is employed. Selection switch 154 is moved to the closed position permitting conduction of electric power to conductor 152 and first and second variable transformers 162 and 164 respectively and to conductor 150. Switch 160 is moved to the open position if not already in that position. Reverse switch 114 is set for the desired direction of rotation of the cutting disc 30. Upon activation of power switch 122 to the closed position, electric power is conducted through conductor 118 to one side of switch 128. Upon activation of start button 130 switch 128 is moved so that electric current is conducted from conductor 118 into conductor 148 and into conductor 150. Electric current then flows from conductor 150 to conductor 152 and into relay 112, causing activation of triple action switch 110 supplying current to the cutting disc motor 32. It is to be noted that indicator lights 104, 106, 108, as well as indicator light 124 is activated denoting supplying of electrical power to motor 32 as well as the supplying of power through fuse 120 and through switch 122. At the same time of activation of cutting disc motor 32, coolant solenoid 92 is also activated permitting flow of coolant through conduit 38. The electric current within conductor 150 is transmitted into conductor 156 through switch 260 into conductor 262. The electric power is then transmitted through switch 274 into conductor 278, through microswitch 136 which is in the normally closed position and into conductor 280 to relay 266. Relay 266 then causes activation of switches 260 and 186. Upon activation of switch 260 current is then conducted from conductor 156 into conductor 264 and from conductor 264 into conductor 292 and 290 to relay 224. Relay 224 causes actuation of switches 244 and 218 resulting in connecting of conductors 208, 220 and 222 and the connecting of conductors 246, 248 and 216. As a result of the activation of switch 260 the power supplied to pulse relay 266 has been shut off, but switches 260 and 186 do not return to their former position but remain in the newly activated position. Electric current is then conducted from conductor 152 through switch 154 into second variable transformer 164. From the transformer 164 current is conducted into conductor 188 through switch 186 into conductor 190 to bridge 192. Also, electrical current is conducted from conductor 264 through conductors 254 and 256 to ground connection 258. It is to be noted that indicator light 272 is now activated denoting that the control system is driving the machine 10 in the forward direction.

From the second variable transformer 164, electric current is supplied through conductor 166 to bridge 168. From the bridge 168 electric current is conducted through conductor 172 to the field 174 of the motor 176. Bridge 168 is connected to ground 258 with the field 174 of the motor 176 being grounded to the bridge 168 through conductor 178.

Electric current from the second variable transformer is conducted through conductor 190 to bridge 192, into conductor 202, through switch 206 into conductor 208 and then into conductors 220 and 222, through switch 236 into conductor 234 and into armature 232 of the motor 176, The ground connection for the armature 232 is provided through conductor 288, switch 226 to conductor 216, conductor 248 and switch 244 to conductor 246, through switch 250 into conductor 252 to bridge 192. Through bridge 192 the ground is provided by means of conductor 254 connected with conductor 256 which then connects to conductor 258.

With the circuit arranged as previously described, the bed 14 of the machine 10 moving forward causing raw stock 28 to be fluted by means of cutting disc 30. The machine 10 continues to move in this forward position until flange 24 located upon collar 18 contacts microswitch 284. As a result, switch 284 is actuated so that electrical current is conducted from conductor 150 and 158 into conductor 282 to activate relay 266. Since relay 266 is a pulse type of relay, switches 260 and 186 are activated to the position shown in FIG. 5 of the drawings. The electric current that is then being supplied to the armature 232 of the motor 176 is transmitted from first variable transformer 162 through conductor 184, through switch 186 to conductor 190 into bridge 192. As the power is being supplied to motor 176 through a different variable transformer and in the forward position, the amount of electric current can be varied that is supplied to index motor 176 thereby changing the speed of motor 176 which was established by means of second variable transformer 164. Because of switch 260 being activated, connecting conductors 156 and 262, electric current that has been supplied through conductors 264, 292 and 290 to relay 224 is shut off. As a result, dual switch arrangement 244 and 218 are moved, each to their normally closed positions connecting conductors 208 and 216, and connecting conductors 246 and 222. The direction of current flowing through armature 232 of motor 176 has been reversed resulting in a reversal of the motor 176. As a result of the reversal of the motor 176, the rotational direction of pulley 44 is reversed resulting in a reversal of shaft 22. Cam 66 then backtracks along cam surface 70 of cam 72 until finally follower 66 contacts stop 64. With the follower 66 so located against stop 64, further rotation of cam 72 is prevented. However, index motor 176 continues to cause rotation of shaft 22 resulting in removal of pawl 56, the pawl 56 contacts microswitch 136 causing activation thereof connecting conductor 138 with conductor 278. Also, electrical power is no longer being transmitted to relay 266, however, switches 260 and 186 are not affected since such are only moved upon a supplying of electric current to relay 266. Because of electrical current being supplied through conductor 138, pulse motor 134 is activated. However, no activation of the counter mechanism has yet occurred. Also, current is conducted from conductor 278 through microswitch 136 to conductor 296 and into activating relay 200. As a result of the activation of relay 200, switch 198 is activated causing the electric current being supplied to the motor 176 to pass through resistor 204. What occurs is a slowing down of the rotational velocity of motor 176.

The pawl 56 moves upon the outer surface of index plate 48 until pawl 56 comes into contact with the next succeeding recess 52 at which time spring 60 causes pawl 56 to become engaged therewith. Because motor 176 has been slowed down due to the additional resistance of resistor 204, the rotational velocity of index plate 48 has likewise been decreased so as to avoid any chance of pawl 56 not becoming engaged with the next succeeding recess 52. Upon the pawl 56 becoming reengaged within a recess, deactivation of microswitch 136 occurs. As a result, electric current is no longer being supplied to pulse motor 134 resulting in a movement of the index counter mechanism one increment. Also, electrical current is no longer being supplied to relay 200 which results in a movement of switch 198 back to the normally closed position directly connecting conductors 196 and 202. Because microswitch 136 has been moved back to the position of connecting conductors 278 and 280, relay 266 is again activated causing movement of switches 260 and 186 back to the previous mentioned forward position. At this time the flute cutting procedure is prepared to repeat in the manner as previously described. However, because of the rotation of shaft 22 with respect to cam 72 through the index plate 48 and associated pawl 56, the second flute to be cut within raw stock 28 will be angularly displaced from the first flute which has been cut. This procedure is to be repeated until a number of flutes established by the counter mechanism of the counter 132 registers zero at which time a complete inactivation of the system will occur by activation of switch 128 to the open circuit position.

AUTOMATIC SETTING — STRAIGHT FLUTE

This control system is to be applied for the embodiment shown in FIG. 2 of the drawings wherein a straight cam surface 70 is employed upon cam 72. The reason for the distinction is that index motor 176 of the helical setting caused both rotational and longitudinal movement of the bed 14 wherein rotational movement of index motor 176 with the embodiment of FIG. 2 will only cause destruction of cam 72 by causing follower 66 to depart from its associated straight cam surface 70. The structure employed with a straight cam 72 is the same as employed with the helical cam except that motor 182 is added as well as microswitch 286.

The counter 132 is again set to the number of desired flutes to be formed upon raw stock 28. Switch 114 is set to establish the rotational direction of cutting disc 30. Switch 154 is moved to the closed position connecting conductor 152 with the variable transformers 162 and 164. Also, switch 160 is activated causing a closing and communicating of conductor 294 to microswitch 286.

Power switch 122 is activated causing the communication of electrical power from conductor 118 to switch 128. Upon activation of start button 130 causing activation of switch 128 supplying current to conductor 148 through switch 154 to conductor 150, relay 112 is activated causing activation of triple action switch 110 resulting in a supplying of power to cutting disc motor 32 and coolant solenoid 92. Also, electric current from conductor 150 is supplied to conductors 156, 158 and 288. From conductor 288 relay 238 is energized causing activation of switches 236 and 226. Activation of switch 226 communicates conductors 216 and 230. Activation of switch 236 communicates conductors 222 and 240. As a result no electric current is being supplied to the armature 232 of the index motor 176 but is now being supplied to the armature 242 of the motor 182.

In the manner as previously described with respect to the helical setting, electric current is supplied through conductor 156 causing activation of pulse relay 266. Switch 260 is activated cutting off electric current to the relay 266. However, conductors 156 and 264 are connected. As a result, electric power is being transmitted as described with the previous helical setting through conductors 254 to bridge 192, but instead of activating index motor 176 motor 182 is activated. In the manner as previously described relating to the helical setting, electric current is being supplied to the field 180 of the motor 182 which is connected directly to each side of the field 174 of the motor 176. Further, electric current is being supplied in a similar manner as in the helical setting from the second variable transformer 164 through switch 186, conductor 190 to bridge 192 and so forth to establish the velocity of rotation of the motor 182 by an appropriate setting of the second transformer 164. Because motor 182 is directly connected to a driving belt through the drive pulley operating the bed 14, bed 14 is moved forward with follower 66 moving longitudinally along straight cam surface 70. Upon bed 14 reaching the forwardmost position, flange 24 causes activation of microswitch 284 closing in an electrically conducting manner conductors 282 and 158. As a result, pulse relay 266 is energized causing activation of switches 186 and 260. Again, as previously described with the helical setting, due to the deenergization of relay 224 and activation of switches 218 and 244, the direction of current flow within armature 242 of the motor 182 is reversed causing a reversal of the direction of movement of bed 14. At this time, also the electric current to the armature 242 of the motor 182 is being supplied through the first variable transformer 162 instead of the second variable transformer 164. The reversal of bed 14 continues until flange 24 causes activation of microswitch 286. Because microswitch 286 is moved to the open position, electric current is not supplied to relay 238 causing deactivation of motor 182 and activation of index motor 176 by means of direct activation of switches 226 and 236. Although microswitch 286 has been activated no electric current is maintained to relay 224 maintaining switches 218 and 244 in the reverse driving position. Again, because in this position follower 66 will be in contact with stop 64, index motor 176 causes pawl 56 to be removed from its associated recess 52 causing activation of microswitch 136.

In the manner as similarly described with respect to the helical setting, pulse motor 134 of the counter 132 is activated. Also, relay 200 is energized causing activation of switch 198 causing the placement of resistor 204 between conductors 196 and 202. As a result, a slowing down of the index motor 176 results. Upon the pawl 56 reaching the next succeeding recess 52 and becoming associated therewith, deactivation of microswitch 136 occurs. Because pulse motor 134 of the counter 132 has been deactivated, a decreasing increment of change of the index counting mechanism is effected as is also an activation of pulse relay 266. Relay 266 activates switches 186 and 260 as previously described with respect to the helical setting again locating switch 260 to conduct electric current in the forward direction through conductors 156, 264 and into conductors 292 and 290 to operate relay 224.

Switches 218 and 244, by reasons of activation of relay 224, are moved to again change the direction of current flowing through conductors 222 and 216 to place movement of motor 182 in the forward direction.

The reason that motor 182 is again activated and not motor 176 is that current from 156 through 260 to 264 to 292 to 294 through 286 to 288 to actuate relay 238 after the activation of microswitch 286, the microswitch 286 is returned to the closed position connecting conductors 150 and 288 resulting in reactivation of relay 238. The system is again ready to repeat itself resulting in the cutting of an additional straight flute within raw stock 28, this next flute being angularly displaced from the previously cut straight flute. The procedure will repeat itself until the desired numbers of flutes have been cut as set by the counter mechanism 132.

If it is ever desired within either the helical setting or the straight flute setting to stop the entire mechanism and hold it in this position for any particular reason, the operator only needs to hold relay 214 resulting in activation of switches 206 and 250. What occurs is in essence a short circuit through resistor 212 of conductors 202 and 252. Because resistor 212 is of sufficient magnitude, the power generated within the circuit is absorbed. Upon deactivation of hold relay 214, switches 206 and 250 are moved to their normally closed positions permitting the particular mode of the system to continue. The system will continue cutting the flute at the particular location at which it was left off.

It has been assumed in the foregoing that if in the cutting of the helical type of flute that a right handed or what is normally termed to be a right handed flute is to be cut within the drill raw stock 28. However, if it is desired to cut left handed flutes which only requires in essence a reversal of the system, activation of relay 276 is to be accomplished by he operator resulting in activation of switch 274 connecting conductors 278 and 264. As a result, what was previously described to be the forward direction would now be the reverse direction and vice-versa.

I claim:

1. In a machine tool for cutting flutes in a workpiece including a base, a horizontally movable bed mounted on said base, a rotatable chuck on said bed for holding a workpiece, a motor means coupled to said chuck for rotation thereof, a cutting tool mounted on said base and being adapted to engage said workpiece for cutting flutes therein, a cam mounted to said chuck and adapted to rotate therewith, said cam having a plurality of recesses therein which correspond to the desired flutes to be cut in said workpiece, a follower mounted to said bed and engaging the recesses in said cam for causing said bed to move horizontal in a first direction and a second direction as said chuck rotates, and control means coupled to said motor means for controlling speed and direction of said motor means, said control means including:
    a source of alternating electrical energy;
    a first electrical path coupled between said source and the field winding of said motor means for energizing the magnetic field in said motor;
    a first rectifier means in said first electrical path for converting the alternating energy into D.C. energy for said field;
    a second electrical path coupled to the armature of said motor means for activating said motor means to cause rotation of said armature;

a second rectifier means in said second path for converting alternating energy to D. C. energy for said armature;

a variable transformer in said second path said variable transformer including a winding thereon, said transformer including a first wiper arm and a second wiper arm spacially positioned to engage the winding of said transformer for providing output voltages at different levels on each wiper arm; switching means responsive to position of bed, a holding pulse relay switching means connected to said switching means of the type which changes positions when energized and retains the established position, said holding pulse relay switching means including a ganged pair of two position switches, one of said two-position switches being coupled between said second rectifier means and said motor means and adapted to engage either a first terminal or a second terminal, said first terminal coupled to said first wiper arm of said transformer, said second terminal coupled to said second wiper arm of said transformer, whereby with said first terminal in engagement, said motor means is operated at a first selected speed by positioning of said first wiper arm, with said second terminal in engagement, said motor means is operated at a second selected speed by positioning of said second wiper arm, said second selected speed being normally greater than said first selected speed; and the other of said pair of two-position switches coupled to means for reversing motor direction.

2. The control system as defined in claim 1 and further including means coupled between said armature and said second rectifier for momentarily introducing a resistive load into said second path at the predetermined interval to cause a voltage drop and decrease the speed of the armature.

3. The control system as defined in claim 1 further including switch means in said second path movable between a first position and a second position, said first position to activate said motor means in a direction opposite to the direction established by said second position, said switch means coupled between said rectifier and the other of said pair of two-position switches.

* * * * *